March 4, 1958   L. G. BOUGHNER ET AL   2,825,415
TANDEM AXLE SUSPENSION AND COMPONENTS
Filed March 3, 1954   5 Sheets-Sheet 1
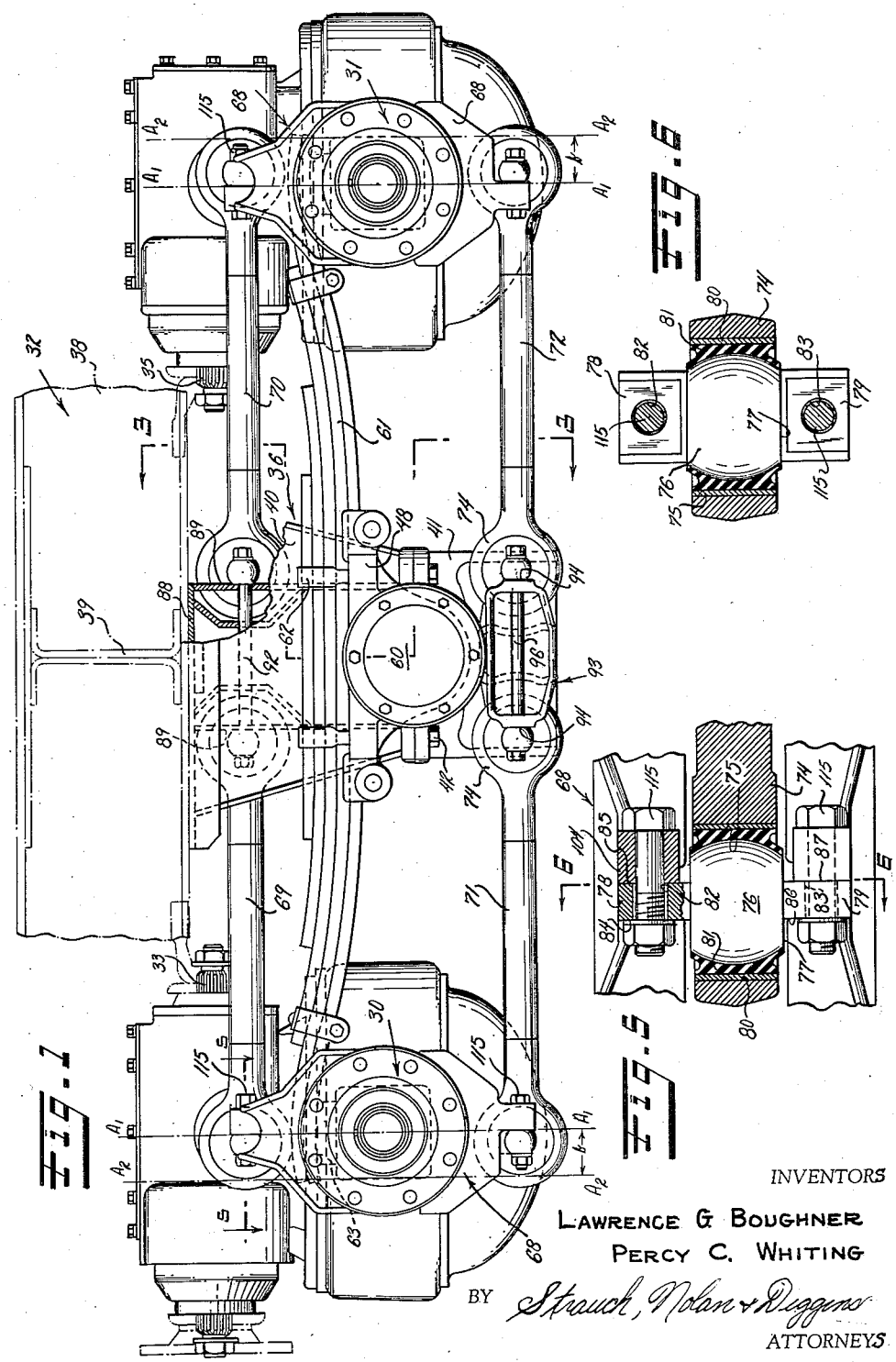
INVENTORS
LAWRENCE G. BOUGHNER
PERCY C. WHITING
BY *Strauch, Nolan & Diggins*
ATTORNEYS

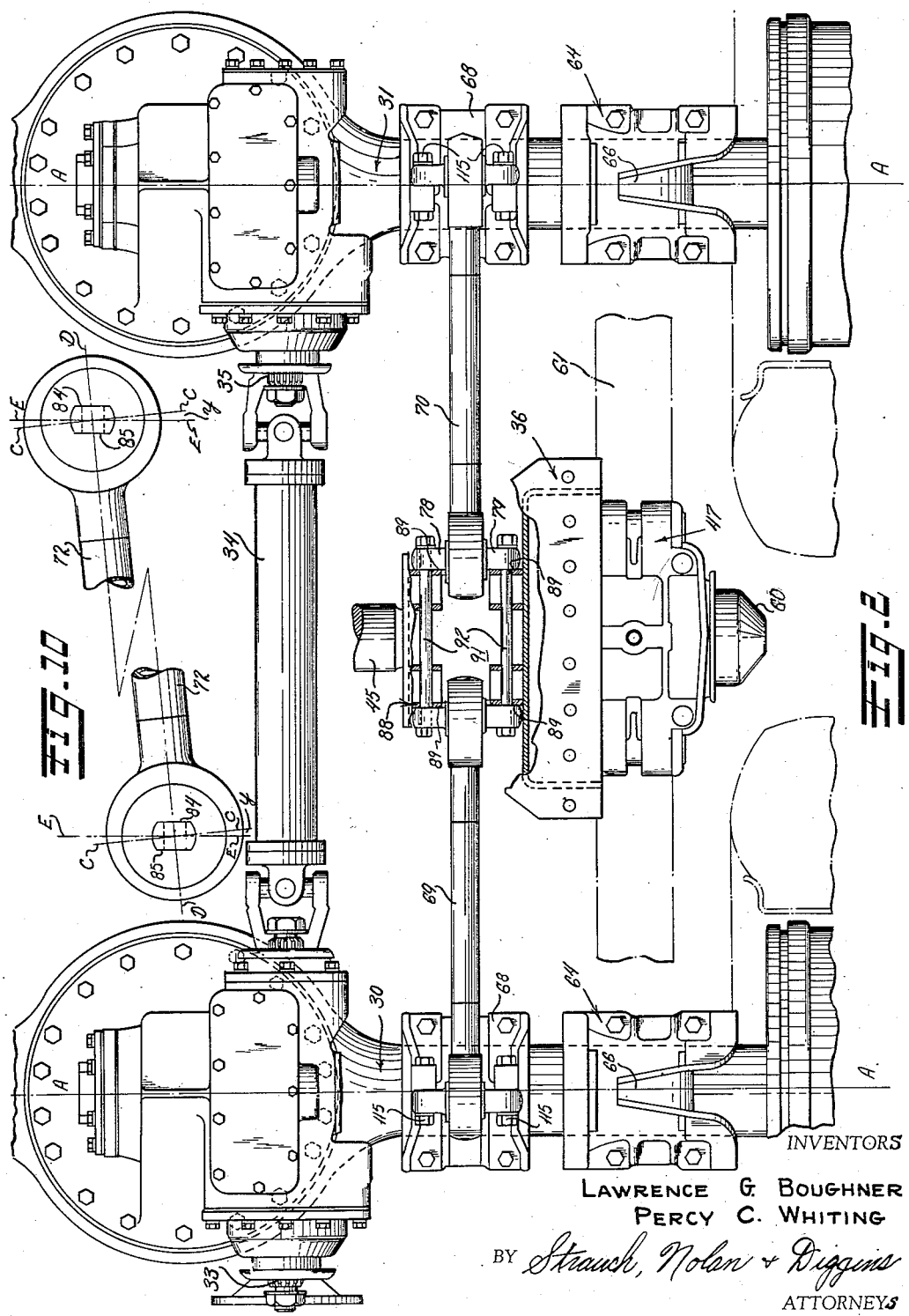

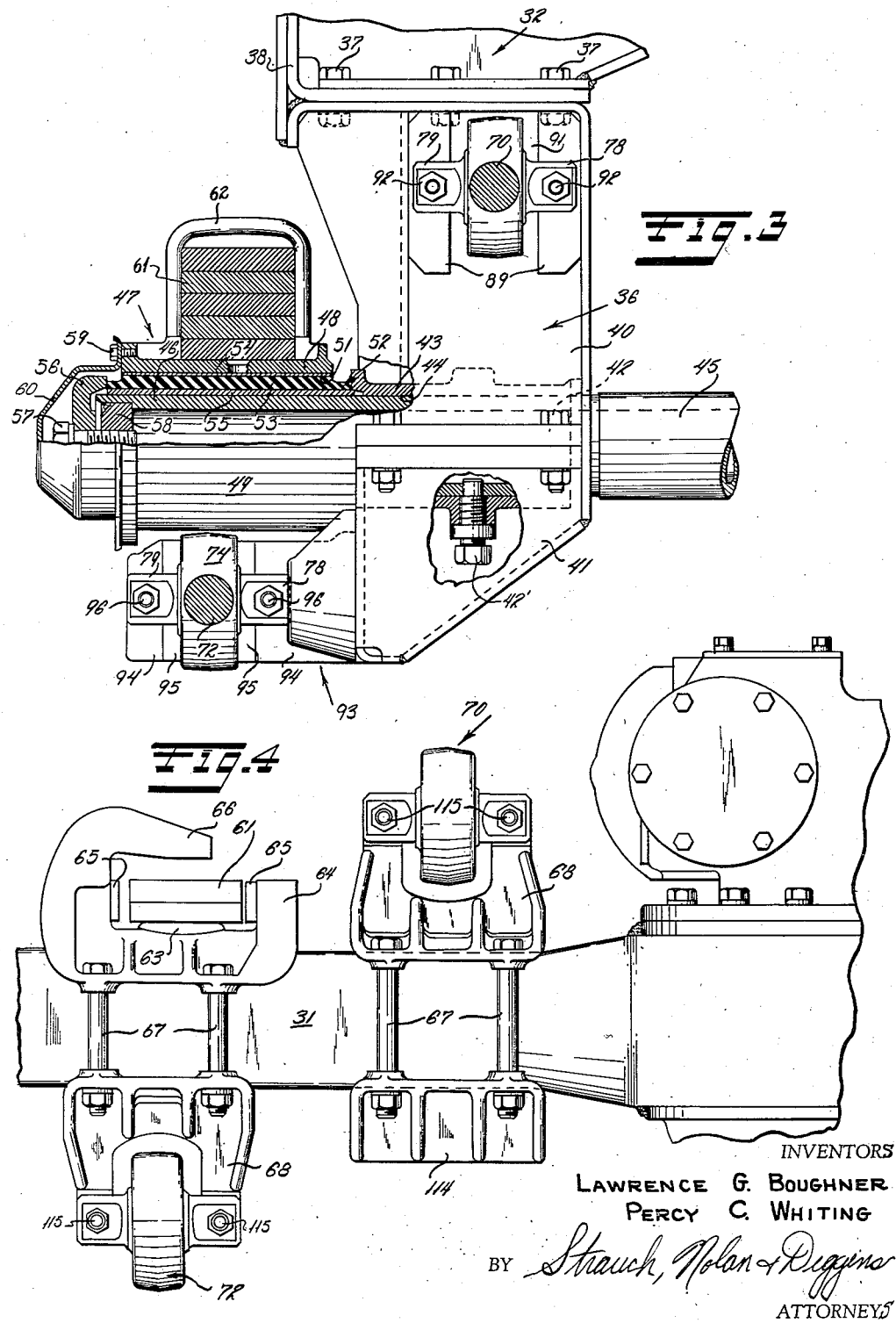

March 4, 1958 L. G. BOUGHNER ET AL 2,825,415
TANDEM AXLE SUSPENSION AND COMPONENTS
Filed March 3, 1954 5 Sheets-Sheet 4
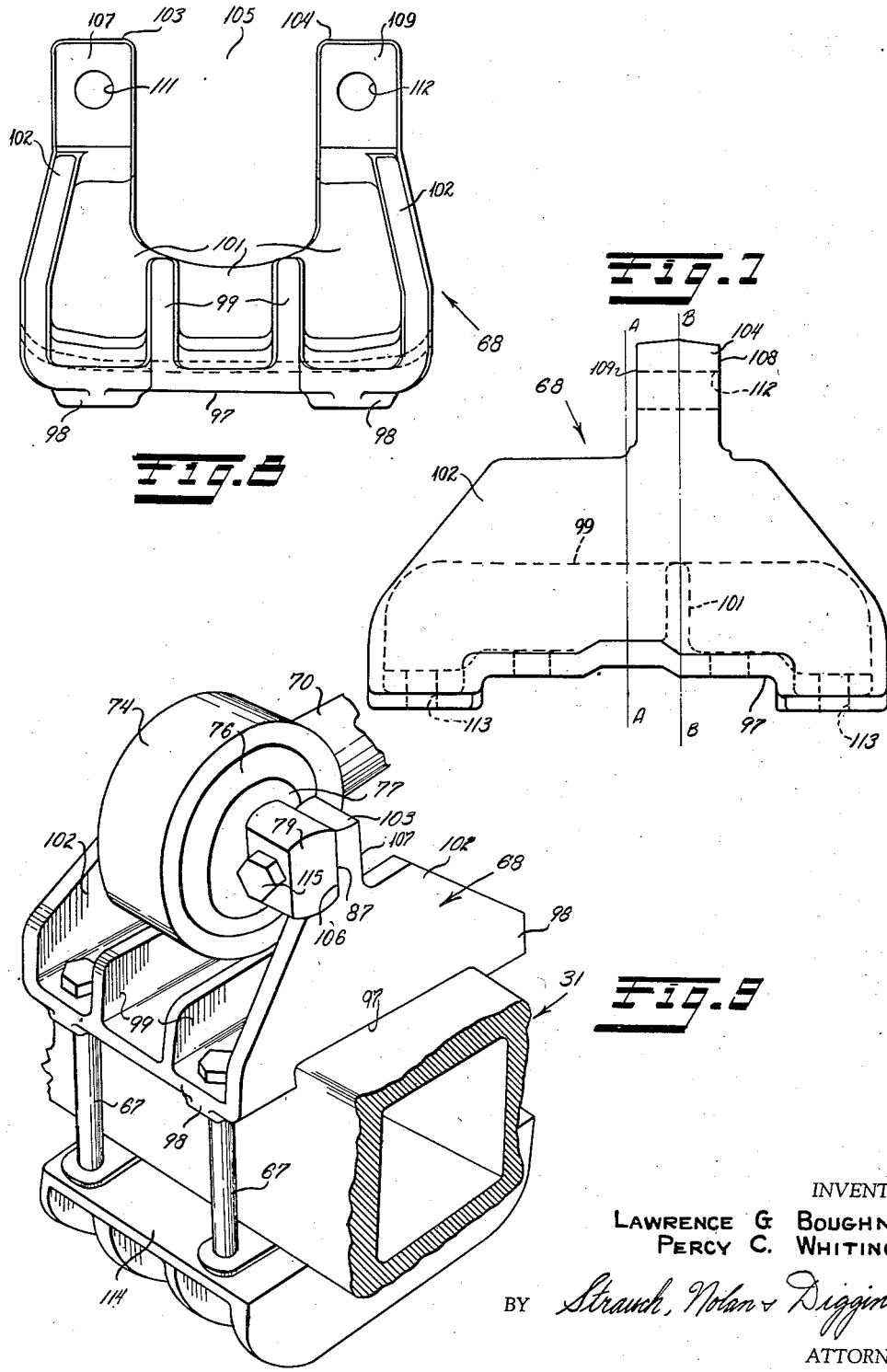
INVENTORS
LAWRENCE G BOUGHNER
PERCY C. WHITING
ATTORNEYS

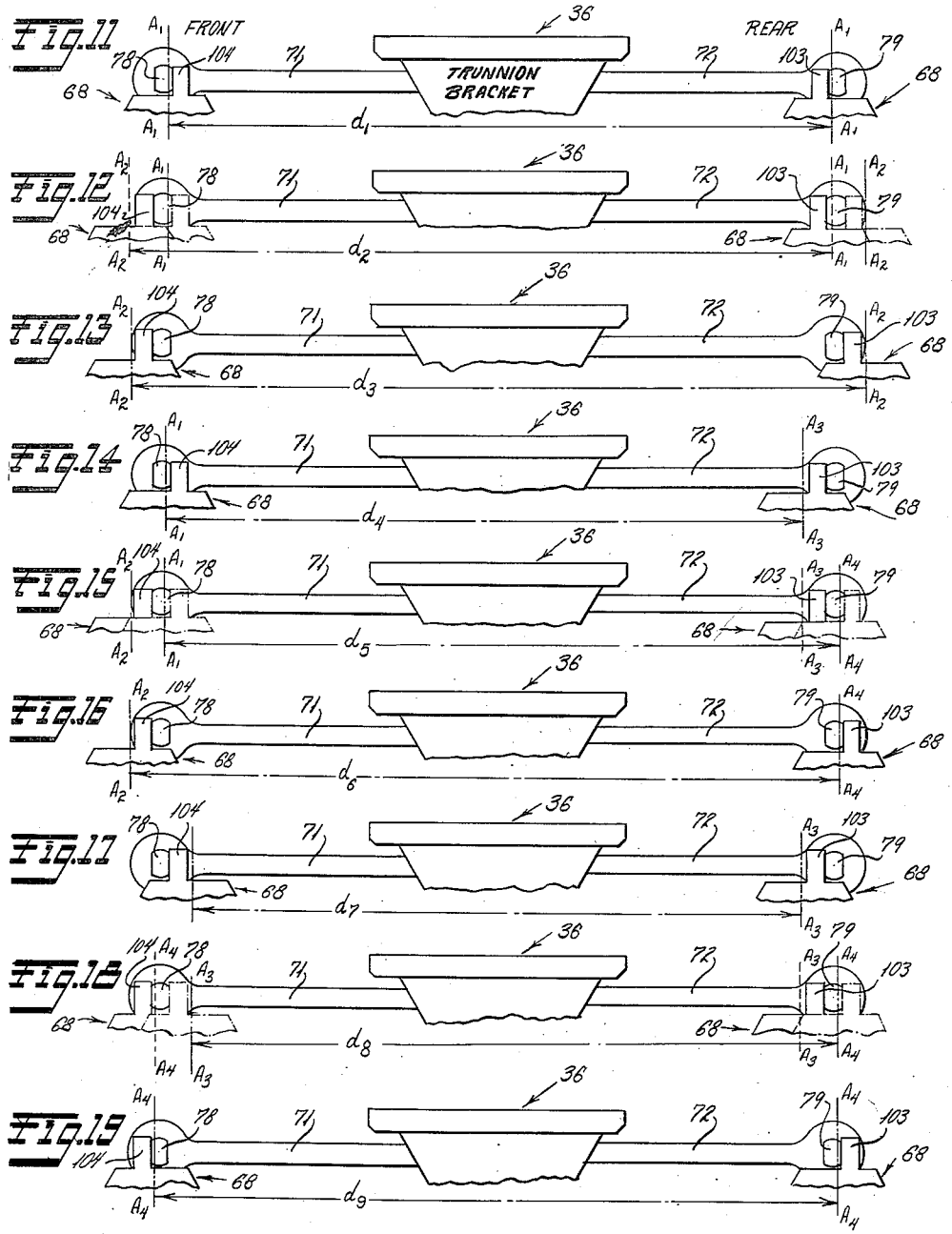

United States Patent Office 2,825,415
Patented Mar. 4, 1958

2,825,415

TANDEM AXLE SUSPENSION AND COMPONENTS

Lawrence G. Boughner and Percy C. Whiting, Detroit, Mich., assignors to Rockwell Spring and Axle Company, Coraopolis, Pa., a corporation of Pennsylvania Application March 3, 1954, Serial No. 413,896

19 Claims. (Cl. 180—22)

The present invention relates to improvements in tandem axle assemblies for vehicles, and more particularly to a new and improved tandem drive axle suspension and its components providing a wide variety of wheel base lengths through the use of interchangeable parts.

Vehicles having tandem drive axle assemblies may be used for a wide variety of loads varying from relatively light to very heavy. When relatively heavy loads are to be carried on the vehicle, it is generally necessary to use sufficiently large diameter high capacity tires to adequately support the wheel load. However, when relatively light loads only are to be carried on the vehicle it is adequate and less expensive to use smaller tires.

Tandem axle assemblies using the larger tires necessitate longer tandem axle spacing than those using the smaller tires, to provide adequate clearances between the tires at the same side of the vehicle. Hence the manufacturer usually supplies the proper tire size and axle spacing to suit the customer's requirements. This has required a large inventory of different size torque rods and associated end connections. The present invention eliminates the necessity for such high inventories and simplifies assembly by providing a number of similar interchangeable and reversible parts that coact to provide suspensions of the desired axle spacing when properly secured together.

Also, prior to the invention, when it was desired to adapt a vehicle already equipped with a suspension for carrying relatively light loads to suit it for heavier loads, larger tires were needed and the tandem drive axle wheel base, that is the distance between the axle centers, had to be lengthened to provide proper clearance between the tires on the tandem axle wheels on each side. The reverse is true when adapting a vehicle from heavy to light load capacity.

When the tires and wheel base were so changed to appropriate size, it was necessary in the prior art to provide new torque rods, springs and associated torque rod brackets of suitable size to suit the new spacing between the axles. This prior art practice has not been satisfactory since it requires a number of parts individual to each axle spacing and the cost of inventories over the country is high. The invention provides for substantially universal adaptation to a wide range of wheel bases without requiring new parts.

The invention is particularly valuable where only one of the two axles in the tandem axle assembly is driven. It is preferable to load the driven axle more than the non-driven axle and for that reason the point of attachment of the suspension to the frame is located closer to the driven axle. In the prior art this required different length torque rods and different torque rod mounting brackets for the separate axles, and in the case of a conversion job the changeover was time consuming and costly. In the invention this arrangement can be secured using the same parts as in dual drive axle assemblies.

Further, vehicles of the type here involved are extensively used in the armed services in and out of combat, so that the complete interchangeability of parts such as torque rods and rod mounting brackets for the axles provided by the invention is very valuable in the field. This is also very important production-wise, whether for military or civilian use, since it enables low inventories for manufacture, supplier and user, and also results in many production economies due to reduced costs in patterns, jigs, and fixtures, etc. The invention provides for torque rods and brackets that are fully interchangeable for all six torque rod positions usually found in such tandem axle units. Also according to the present invention, the lower torque rod axle brackets are interchangeable with upper torque rod axle brackets, and the torque rods are identical and interchangeable in all six torque rod positions. These features have never been available prior to the invention.

It is the primary object of the invention to provide a novel tandem axle suspension for a vehicle wherein the torque rod system components are chiefly interchangeable and capable of different assembly positions for suiting different axle spacings in the suspension.

A further object of the present invention is to provide in a tandem axle suspension a torque rod mounting system and components thereof in which a wide variety of wheel base spacings in the suspension may be quickly obtained for use with various tire sizes by merely dismantling and reassembling a few parts.

It is a further object of the present invention to provide for the axles of a pivoted tandem axle suspension similar novel torque rod mounting brackets each provided with a pair of spaced mounting posts having two opposed sets of parallel and aligned flat mounting surfaces, whereby each set of said mounting surfaces may be used in conjunction with a torque rod to locate the axle to which the bracket is secured in different positions with respect to the pivot axis of the tandem axle suspension.

It is also an object of the present invention to provide, for a trunnioned tandem axle suspension, a novel torque rod having at each end a pair of side arms having a set of parallel aligned inner and outer flat mounting surfaces, whereby each set of mounting surfaces may be used in conjunction with an associated torque rod mounting bracket to locate either axle of the suspension at different positions with respect to the trunnion.

A further object of the present invention is to provide a novel tandem axle suspension wherein a plurality of special similar torque rods are connected at one end thereof to the trunnion support brackets and a plurality of special similar torque rod mounting brackets are mounted on each axle, whereby the position of the axis of either axle relative to the trunnion may be selected or changed by connecting the brackets to one of a plurality of sets of surfaces on said torque rods, thereby obtaining a variety of wheel base spacings.

A further object of the present invention is to provide a novel mounting bracket having a pair of torque rod mounting posts which are off-set from the center of the axle attaching means thereon which corresponds with the axis of the axle to which said brackets are attached, whereby many additional wheel base spacings may be obtained merely through reversal of the mounting bracket position on the axle.

Another object of the present invention is to provide a novel tandem axle suspension employing a plurality of identical torque rods and torque rod end attachment brackets whereby any one of six different interaxle spacings may be quickly obtained through mere removal and relocation of the brackets.

Another object of the present invention is to provide for use in a tandem axle suspension novel similar torque rod mounting brackets which are fully interchangeable with others in the suspension so that any one may be connected to either axle of the tandem axle suspension in any one of the torque rod positions.

Another object of the present invention is to provide such a novel torque rod mounting bracket which is relatively inexpensive to make since it has only two machined surfaces which may be formed in a single operation.

Another object of the invention is to provide for use in a tandem axle suspension novel similar torque rods which are fully interchangeable with others in the suspension so that any one may be used in any torque rod position in connection with either axle of the tandem axle suspension.

Another object of this invention is to provide a torque rod having novel resilient universal end connections which avoid overstressing of said connections when the vehicle hits a bump in the road under normal load or overload conditions to such extent that the connections are virtually under no torsional stress when the vehicle is normally loaded.

A further and related object of the present invention is to provide a novel torque rod having a resilient connection and side arms with faces at an angle to the rod axis with bolt holes therein having sufficient clearance so that the bolts for assembly may be readily slid through said side arm bolt holes even when said side arm holes are at an angle to the corresponding holes in the bracket to which they are connected, and wherein tightening said bolts draws a side face of the respective side arm into abutment with the adjacent wall of said bracket thereby imparting torsional pre-stress to the resilient end connection when the vehicle is unloaded, which stress is virtually removed when the vehicle is loaded.

Many other and further objects, advantages and features of the present invention will become apparent from the following specification when considered in connection with the accompanying drawings and claims forming a part thereof:

In the drawings:

Figure 1 is a side elevation of a tandem axle suspension incorporating the improved torque rods and torque rod mounting brackets according to a preferred embodiment of the invention;

Figure 2 is a fragmentary top plan view illustrating one side of the suspension shown in Figure 1, with the chassis frame members and portions of some parts being omitted for clarity;

Figure 3 is a fragmentary end elevation view, partially in section and taken substantially along line 3—3 of Figure 1;

Figure 4 is a fragmentary end elevation view showing in detail the axle spring brackets, and the torque rod end mounting axle brackets of the present invention;

Figure 5 is a fragmentary sectional view through the ball and socket end connection of the torque rod of the present invention, taken substantially along line 5—5 in Figure 1;

Figure 6 is a sectional view through the ball and socket end of a torque rod of the type shown in Figure 5, looking in the direction of arrows 6—6 in Figure 5;

Figure 7 is a side elevation view of the torque rod mounting axle bracket of the present invention;

Figure 8 is an end view of the bracket of Figure 7;

Figure 9 is a perspective view of the bracket of Figures 7 and 8 mounted on the axle housing and showing the end of a torque rod connected thereto;

Figure 10 is a side view of the unassembled torque rod of the present invention showing angular inclination of the resilient torque rod side arm connections to achieve pre-stress therein upon assembly; and Figures 11 through 19 are diagrammatic illustrations of various wheel base spacings and axle positions which may be obtained using the invention.

Referring to the drawings, particularly Figures 1 and 2, the tandem axle suspension comprises spaced parallel drive axle assemblies 30 and 31, hereinafter referred to as the front rear axle and rear axle, respectively, connected to support a vehicle chassis frame 32 in a manner described in detail below. A main propeller drive shaft (not shown) drives the pinion shaft 33 of the front rear axle 30, and a propeller drive shaft 34 extends from the front rear axle pinion shaft 33 to the rear axle pinion shaft 35, as shown in Figure 2.

Referring to Figures 1 and 3, a pair of depending side brackets 36 (only one of which is shown) are bolted at 37 to long side frame members 38 and to cross frame member 39 of chassis 32, one at each side of the vehicle. Brackets 36 comprise upper and lower sections 40 and 41 bolted together at 42 to form a boss 43 having a circular bore 44 extending therethrough. A cross tube 45, only one end of which is shown, is non-rotatably supported on the chassis by securing it adjacent each end in bores 44 of brackets 36 as by bolts 42', as shown in Figure 3.

Each end of cross tube 45 extends outwardly from the brackets 36 to form a pair of trunnions 46 (only one of which is shown) for receiving a spring seat 47 which has a platform section 48 and a boss section 49 having a bore 51 extending therethrough. Spring seat 47 is mounted on trunnion 46 by means of a resilient bushing 52 comprising a rubber sleeve 53 firmly held under radial compression between outer steel sleeve 54 and inner steel sleeve 55 with the outer sleeve 54 being press-fitted into bore 51 of the spring seat boss. The sub-assembly comprising spring seat 47 and bushing 52 is mounted on the end of trunnion 47 and held in place by means of an annular cap plate 56 pressed against one end thereof by a bolt 57 threaded into annular ring 58 welded or otherwise secured at the open end of trunnion 47, as indicated in Figure 3. Bushing 52 resiliently permits spring seat 47 to rock relative to trunnion 47 and frame 32, with the rubber sleeve 53 taking up all the torsion resulting from such relative rotation. Cap plate 56 and bolt 57 are enclosed by a cap 60 secured to the spring seat boss as by a plurality of screws 59.

A spring 61 is fastened to the spring seat platform by a plurality of U-bolts 62 on each side of the vehicle, outwardly of side brackets 36 and longitudinal side frame members 38, with each spring being of suitable length to be used for a wide range of drive axle spacings. The ends of springs 61 rest freely upon saddle pads 63 which form part of spring brackets 64. Brackets 64 have inner spring guide plates 65 for guiding the sides of the ends of springs 61 and an overhanging spring retaining arm 66. The spring brackets 64 are secured upon the axle housings 30 and 31 at each end thereof by four bolt assemblies 67 and, as illustrated in Figure 4, also fasten lower torque rod straddle mount brackets 68 to the axle. At one side of the vehicle longitudinally aligned upper torque rods 69 and 70 extend from opposite sides of bracket 36 to upper torque rod straddle mount brackets 68 on axles 30 and 31. Brackets 68 are all identical and interchangeable.

These torque rods are identical and may be interchangeably used in all six torque rod positions. As shown in the drawings, particularly in Figures 5, 6 and 10, each torque rod is formed at both ends with an identical universal socket 74 having a cylindrical bore 75 at right angles to its length. A chiefly spherical ball 76 having parallel flat sides 77 and oppositely extending integral arms 78 and 79 is resiliently mounted in bore 75 by rubber bushing 81 which is of conventional construction and surrounded by a metal shell 80 press fitted into the bore 75. Arms 78 and 79 are of equal size and are formed with apertures 82 and 83 respectively. The opposite sides 84 and 85 of arm 78 are flat, parallel, symmetrical with respect to the axis of ball 76 and perpendicular to the longitudinal axis of the torque rod. Similarly the opposite sides 86 and 87 of arm 79 are flat and lie in the same planes as sides 84 and 85 respectively of arm 78.

The trunnion support bracket 36 on the left side of the vehicle frame is formed with an integral torque rod end straddle mounting portion 88 for connecting thereto the ends of the upper torque rods. This portion 88 is formed with two transversely aligned flat vertical mounting walls 89 on each side of the bracket facing an axle, as shown in Figures 1, 2 and 3. These walls serve for mounting the flat sided arms 78 and 79 of the adjacent top torque rod end connections. A clearance space 91 is provided in bracket 36 for the adjacent end socket of the torque rods. Two bolt assemblies 92 extend through left side bracket 36 and holes 82 and 83 for mounting the torque rod ball arms with flat faces 84 and 86 flush against the associated flat walls 89.

As best shown in Figure 3, each side depending bracket 36 is formed with a torque rod end mounting bracket extension 93. Each such extension 93 extends outwardly from the lower section 41 of bracket 36 to straddle mount the inner ends of the pair of lower torque rods at that side. Bracket extension 93 is formed on each side facing an axle with a pair of transversely aligned flat vertical mounting walls 94 and having a clearance recess 95 to accommodate sockets 74 of the associated lower torque rods. Two bolt assemblies 96 extend through each bracket extension 93 for mounting the torque rod ball arms with flat faces 84 and 86 flush against the associated flat walls 94.

Each of the torque rods is connected at its other end to one of the identical and interchangeable torque rod straddle mount brackets 68 secured to the axle housings.

Referring particularly to Figures 7, 8 and 9, which illustrates an upper straddle mount bracket 68, a saddle base 97 is provided for engaging the rectangular axle housing and bolting flanges 98 extend along the housing. Web 99 and cross web 101 reinforce the bracket. Side walls 102 and the upper parts of cross web 101 form a base from which project upwardly a pair of posts 103 and 104 which have a space 105 between them to clear the torque rod end sockets. Post 103 has a pair of spaced parallel flat mounting faces 106 and 107 on opposite sides, and post 104 has a pair of spaced flat parallel mounting faces 108 and 109 on opposite sides. Faces 106 and 108 lie in the same plane, and faces 107 and 109 lie in a parallel plane. Bores 111 and 112 extend through posts 103 and 104 with their axes parallel and perpendicular to the mounting faces. Bolting flanges 98 are formed with holes 113.

Posts 103 and 104 are longitudinally displaced to one side of the line A—A of Figures 2 and 7 which line indicates the longitudinal centerline of the axle. Line B—B in Figure 7 indicates the center line of off-set posts 103 and 104 parallel to the axle axis. As indicated in Figure 2, when these brackets 68 are assembled on the axle housings, bracket centerlines A—A always coincide with the axle centerlines.

Torque rod brackets 68 of the present invention are thus identical and interchangeable for use in all torque rod positions with either the upper or lower torque rods. The six brackets 68 may be mounted in different 180° reversed positions on the several axle housings to correspond to a large number of optional tandem axle spacings as will appear. In all positions the torque rods and associated axle mounting brackets 68 provide the parallelogram type suspension of Figure 1. With these improved torque rod ball joint side arm mountings any out-of-line condition of the two axles may be corrected by shims. Adjustment of the tilt of both axle vertical centerlines is made possible by selective shim insertion between torque rod end side arms and the various respective mounting brackets.

Each of the four torque rod mounting brackets 68 for the lower torque rods is mounted adjacent an end of its associated axle housing by the four bolt assemblies extending through the bolt holes 113 and four corresponding bolt holes in associated spring bracket 64, as shown in Figure 4. As also shown in Figures 4 and 9, axle saddle brackets 114 are provided so that the two upper torque rod mounting brackets 68 may be likewise fastened in position on the spaced axle housings by four bolt assemblies 67 which like lower bolt assemblies 67 extend through aligned holes in the saddle and mounting brackets. The outer ends of all of the torque rods are connected to mounting brackets 68 by pairs of bolt assemblies 115 as will appear.

The reversible torque rod mounting brackets and the interchangeable torque rods of the present invention make it possible to obtain any of a series of nine different tandem axle spacings plus three additional wheel positions, as shown in the diagrammatic illustrations of Figures 11 to 19.

For any given orientation of the straddle brackets 68 on the respective tandem axles 30 and 31, the interchangeable brackets 68 and associated torque rods of the present invention make it possible to achieve any one of three different wheel bases, minimum, intermediate and maximum and conversion between them may be obtained by a very simple operation requiring only the removal and replacement of six bolts. For example, referring to the orientation of Figures 1 and 2, the axle spacing shown therein corresponds to that diagrammatically illustrated in Figure 11, and this provides the minimum axle spacing $d_1$, when the brackets 68 on both tandem axles are oriented so that bracket posts 103, 104 are both located between trunnion 44 and axle axes $A_1$—$A_1$. This orientation is shown in the diagrammatic illustrations of Figures 11, 12 and 13. To obtain a different axle spacing from that shown in Figures 1 and 2 without unbolting any of the brackets, it is only necessary to jack up chassis 32, remove the six bolt assemblies 115 on foremost axle 30 shift the axle 30 forwardly to the other side of the associated upper and lower torque rod side arms 78, 79 which remain fixed relative to the trunnion and chassis and then replace bolt assemblies 115 to secure posts 103, 104 to arms 78, 79 in the position indicated in full lines in Figure 12. This produces a forward displacement of axle 30 equal to the distance $b$ shown in Figure 1, and it is to be noted that the displacement $b$ is larger than either the width of arms 78, 79 or of posts 103, 104, so that an appreciable change in axle spacing is accomplished by such displacement of the position of the bracket posts with respect to the torque rods.

Intermediate axle spacing $d_2$ diagrammatically illustrated by Figure 12 for the particular orientation of brackets 68 on the axles in Figure 1 is obtained by displacing bracket posts 103 and 104 of one axle to the other side of upper and lower torque rod end connection side arms 78 and 79.

To obtain the maximum axle spacing for this particular orientation of the brackets 68 on the axles, the bracket posts 103, 104 on the rearmost axle 31 are similarly displaced to the other side of upper and lower torque rod side arms 78, 79 and reassembled with the posts on axle 31 now being in the position indicated in full lines in Figure 13. This produces an additional axle spacing equal to distance $b$ shown in Figure 1, and such orientation of brackets 68 results in a maximum axle spacing $d_3$ corresponding to that shown in the diagrammatic illustration of Figure 13.

The torque rod mounting brackets and torque rod mounting system of the present invention thus would make it possible to achieve three different axle spacings irrespective of whether bracket posts 103, 104 are set off center from bracket and axle axes A—A as indicated in Figure 7. For example if these posts were centered with line A—A of Figure 7 the above three relative axle spacings would be available. However, referring particularly to Figures 14 through 19, the further off-set feature of the bracket posts makes it possible to achieve six additional different axle spacings.

As illustrated in Figures 14 to 16, three additional axle spacings may be obtained through reorientation of one set of axle brackets 68, either on the forward or the rear axle, by removing bolt assemblies 67 at the selected axle, turning the three brackets 68 on the axle longitudinally 180°, and reassembling those brackets on the axle in this reoriented position. Also three further different axle spacings may be obtained by also similarly reorienting the three brackets 68 on the other axle, as illustrated in Figures 17 to 19.

Referring particularly to Figures 11 through 19, the novel torque rod mounting system of the present invention, comprising brackets 68 having the foregoing offset feature, makes it possible to locate the axis A—A of each of said axles 30 and 31 at any one of four positions relative to the trunnion by simple quick adjustments. These four axle positions are identified in Figures 11–19 as $A_1$—$A_1$, $A_2$—$A_2$, $A_3$—$A_3$, and $A_4$—$A_4$, respectively; and they make it possible to obtain nine axle spacings indicated as $d_1$ through $d_9$ in Figures 11 through 19, respectively. For each such different axle spacings, a different length propeller shaft 34 is inserted between front and rear pinion shafts 33 and 35. These four axle positions also make it possible to achieve the three additional positions shown in dotted lines in Figures 12, 15 and 18 and having wheel bases equal to $d_2$, $d_5$, $d_8$ respectively. It will be noted that in all instances the positions of the torque rods are unchanged, and the change in axle spacing is accomplished by simply moving the axles and/or brackets 68 thereon relative to the torque rod outer ends.

In vehicles of this type, front rear axle 30 is frequently used as the only driving axle, and in such case there is no propeller drive shaft 35. With such an arrangement, it is advantageous to increase the driving traction at the front axle 30 by causing it to run heavy. This is accomplished by the use of any one of the three intermediate axle spacings shown in Figures 12, 15 and 18 respectively, with the front axle 30 closer to the trunnion pivot center than the rear axle 31. For example, assuming that in Figures 12, 15 and 18 the left hand set of brackets 68 are on the forward axle 30, then the brackets on both axles would be in the positions shown in dotted line in those figures. This puts the left (front) axle axis A—A closer to the trunnion axis than the right (rear) axle axis A—A, and the former therefor carries a greater portion of the vehicle load. Heaviest loading of front axle 30 would occur when brackets 68 on axle 30 are in the position shown in Figure 17 on the left and brackets 68 on rear axle 31 are in the position shown in Figure 13 on the right. Heaviest loading of rear axle 31 would occur when brackets 68 for both axles are in the positions shown in solid lines in Figure 15. It is thus apparent that the present invention not only enables a wide variety of axle spacings to accommodate many different tire sizes, but it also provides a means when only one of the two tandem rear axles is driven to increase driving traction in the driven wheels for more efficient operation of the vehicle.

Referring to Figure 10, the ball and bushing unit of each torque rod end connection is preferably press-fitted into bore 75 with the parallel mounting faces of each side arm projecting from the ball oriented parallel to the plane C—C which is perpendicular to the axis D—D of the torque rod, such orientation being substantially the same as when the suspension is under normal vehicle load. Thus these faces (84—87 in Figure 5) are displaced through a small acute angle y formed by intersection of a plane E—E parallel to such faces, when the suspension is unloaded with plane C—C which is perpendicular to the axis D—D of the torque rod. The bolt holes through the side arms are purposely made slightly oversize, as shown in Figure 5, in order that the mounting bolts may be freely inserted during assembly when the suspension is unloaded, notwithstanding the angular displacement y of the parallel mounting faces relative to the respective bracket mounting faces. When tightened, the bolt assemblies connecting the side arms (78, 79 of Figure 5) to the bracket mounting posts 103, 104 on the axle brackets 68 bring the flat side faces of the ball arms into abutment with the respective flat faces on the posts. Similarly, the bolt assemblies 92 and 96 mounting the torque rod ball side arms on side brackets 36 bring the flat side arm faces into flush contact with the flat surfaces 89 and 94, respectively, when tightened. This torsionally prestresses the resilient bushing in each end of the torque rods, and this stress is usually relieved under normal vehicle load when the rear wheels suspension substantially assumes the geometric shape illustrated in Figure 1 wherein torque rods 69—72 are all parallel to each other in static condition with the axle wheels supported on flat road.

The present invention provides an improved tandem axle suspension having a structurally simple and relatively inexpensive bracket and torque rod system making a wide variety of axle spacings available to accommodate various tire sizes for different normal vehicle load conditions. Also, when only one tandem axle is driven, the invention makes it possible to provide greater traction at that axle by the proper relative positioning of the axles with respect to the trunnion of the suspension. Further, the invention provides a novel torque rod system having resilient torque rod end connections which are pre-stressed in assembled unloaded conditions so as to have virtually no residual stress in the suspension under loaded operating conditions. Moreover, the invention provides an axle mounting torque rod system having identical torque rods and identical torque rod axle mounting brackets which are fully interchangeable, thereby decreasing the necessary inventories by manufacturer, distributor and vehicle user, and resulting in appreciable production savings. The torque rod axle mounting brackets, being each longitudinally reversible and having provision for attachment of the torque rod ends on either side of their posts 103, 104, make available a number of different tandem axle spacings, both in initial assembly and for conversion to meet a changed load condition of the vehicle.

It is apparent that the present invention may be embodied in other specific forms without departing from the spirit or essential characteristics thereof and the present embodiment is therefore to be considered in all respects as illustrative and not restrictive. The scope of the invention is to be indicated by the appended claims rather than by the foregoing description and all changes which come within the meaning and range of equivalency of the claims are therefore intended to be embraced therein.

What is claimed and desired to be secured by United States Letters Patent is:

1. In a tandem axle vehicle having a frame and two parallel tandem axles longitudinally spaced beneath the frame, a spring suspension interconnecting said axles and frame, and a plurality of substantially parallel rods extending from each of said axles to attachment with said frame intermediate said axles for resisting drive and/or brake torque reactions incident to axle operation, and brackets mounting the torque rod ends upon the axles, each bracket having at least two torque rod end mounting faces similarly spaced longitudinally of the vehicle, and means for attaching the respective torque rod ends to one or the other of said faces of each said bracket whereby a plurality of different axle spacings are available in said suspension with the same torque rods and brackets.

2. In a tandem axle vehicle having a frame, parallel transverse axles beneath the frame and a suspension interconnecting the frame and axles, said suspension comprising a suspension mounting means at each side of the frame between the axles, spring means interconnecting each said mounting means and the axles, and substantially parallel torque rods extending forwardly and rearwardly from said mounting means to said axles, and brackets secured to said axles for mounting the associated ends of said torque rods, each bracket having two torque rod end attachment faces similarly spaced longitudinally of the vehicle and each torque rod having at its axle mounted end two similarly longitudinally spaced mounting faces, and means for attaching said torque rod ends to said brackets with one or the other of said torque rod end faces seated on one or the other of said bracket faces whereby any of a plurality of different axle spacings are available in said suspension with the same torque rods and brackets.

3. A torque rod end mounting bracket comprising a base having an axle housing mounting portion and torque rod end attachment posts upstanding from said base spaced from said axle housing mounting portion and having parallel axis bolt holes therethrough, said posts being transversely aligned and having front and rear parallel flat torque rod end attachment faces, the front faces on said posts lying in a common plane parallel to a common plane containing said rear faces and normal to the axes of said bolt holes.

4. A torque rod end mounting bracket comprising a base having on its underside a transverse longitudinally centered axle housing mounting socket adapted to be aligned with respect to the axis of the axle housing upon which it is to be mounted and spaced torque rod end attachment posts upstanding from said base spaced from said axle housing mounting portion and having parallel axis bolt holes therethrough, said posts being transversely aligned but being offset longitudinally with respect to said socket and having front and rear parallel flat torque rod attachment faces, the front faces lying in a common plane parallel to a common plane containing said rear faces and normal to the axes of said bolt holes.

5. In a tandem axle motor vehicle, a frame, a pair of springs pivoted upon a common axis on the frame and extending therefrom to present a pair of spring ends on each side thereof, two parallel axles arranged in tandem, means for operatively connecting said axles to said spring ends on each side of said axis, said means permitting relative movement therebetween and permitting connection of said axles at various points on said spring ends, a set of parallel torque rods connected at one end to said frame adjacent the axis and extending therefrom to a point adjacent said axles, brackets secured upon said axles, each bracket having two torque rod end mounting faces spaced apart longitudinally of the vehicle, and means for attaching the torque rod ends adjacent the axles to one or the other of said mounting faces to obtain optimum tandem axle spacing in the vehicle.

6. In a tandem axle suspension having a torque rod mounting system adaptable to a plurality of tandem axle spacings, a frame, a trunnion on said frame, a pair of springs extending from the ends of said trunnion, a pair of axles operatively connected to said springs one on each side of said trunnion, a plurality of torque rods connected to said frame adjacent said trunnion on each side thereof with their ends extending to a point adjacent said axles, said latter torque rod ends each comprising a pair of side arms extending laterally therefrom and having a first and second pair of parallel aligned mounting faces thereon, each such pair of faces being spaced a different distance from said trunnion, a plurality of torque rod mounting brackets on said axles each comprising a base having a pair of spaced posts extending therefrom and said posts each having a first and second pair of parallel aligned mounting faces thereon, and means for connecting said bracket posts to said torque rod side arms with either of said first and second mounting faces on said bracket abutting either of said first and second faces on said torque rod ends for providing any of a plurality of positions of the axis of either axle relative to the trunnion.

7. In a tandem axle suspension having a torque rod mounting system adaptable to a plurality of tandem axle spacings, a frame, a trunnion on said frame, a pair of springs extending from the ends of said trunnion, a pair of axles operatively connected to said springs one on each side of said trunnion, a plurality of torque rods connected to said frame adjacent said trunnion on each side thereof with their ends extending to a point adjacent said axles with the ends on one set of said torque rods adjacent at least one of said axles having a pair of side arms extending laterally therefrom and having a first and second pair of parallel aligned mounting faces thereon, each such pair of faces being spaced a different distance from said trunnion, torque rod mounting brackets on said axles with the brackets on said one axle having a base with a pair of spaced posts extending therefrom, said posts having a first and second pair of parallel aligned mounting faces thereon, and means for connecting said bracket posts to said torque rod side arms with either of said mounting surfaces on said bracket posts abutting either of said surfaces on said torque rod ends.

8. In a tandem axle suspension having a torque rod mounting system adaptable to a plurality of tandem axle spacings, a frame, a pair of springs pivoted upon a common axis at opposite sides of the frame, a pair of axles operatively connected to said springs one on each side of said frame, a plurality of torque rods connected to said frame adjacent said axis with their outer ends extending to a point adjacent said axles, a set of torque rod mounting brackets on said axles each bracket comprising two longitudinally spaced optional mounting faces for said outer torque rod ends, means for securing said torque rods outer ends upon one or the other of said faces, the center axis of said brackets on each axis coinciding with the longitudinal axis of said axle when mounted thereon, said latter mounting means being off-set from the center of said brackets to produce an eccentric effect whereby each of said brackets may be longitudinally reversed to change their position relative to the axle axis whereby the said eccentric effect of said brackets makes it possible to achieve a large number of different tandem axle spacings using the same brackets and torque rods.

9. In a tandem axle suspension having a torque rod mounting system adaptable to a plurality of tandem axle spacings, a frame, a trunnion on said frame, a pair of springs extending from the ends of said trunnion, a pair of axles operatively connected to said springs one on each side of said trunnion, a plurality of torque rods connected to said frame adjacent said trunnion on each side thereof with their ends extending to a point adjacent said axles, said latter torque rod ends comprising a pair of side arms extending laterally therefrom and having an inner and outer pair of spaced parallel aligned mounting faces thereon, each such pair of faces being spaced a different distance from said trunnion, torque rod mounting brackets on said axles comprising a base having a pair of spaced posts extending therefrom and said posts having a first and second pair of spaced parallel aligned mounting faces thereon, means for connecting said bracket posts to said torque rod side arms with either of said first and second mounting faces on said bracket abutting either of said inner and outer faces on said torque rod ends so that the position of the axis of either axle relative to the trunnion may be selected to achieve any of a large number of different tandem axle spacings between said axles, the central transverse axis of said brackets coinciding with the axis of said axles when secured thereon, and said posts with said pair of faces thereon being off-set from said central axis of said bracket to produce an eccentric effect, so that said brackets on either axle may be reversed to change the position of said brackets on either axle to change the position of said latter mounting faces relative to the axis of the axle whereby the said eccentric effect of said brackets makes it possible to achieve several further different tandem axle spacings.

10. In a tandem axle suspension having a torque rod mounting system adaptable to a plurality of tandem axle spacings, a frame, a trunnion on said frame, a pair of springs extending from the ends of said trunnion, a pair of axles operatively connected to said springs one on each side of said trunnion, a plurality of identical interchangeable torque rods comprising a central elongated rod portion with a pair of side arms extending laterally therefrom at each end thereof, each of said side arms having a pair of spaced inner and outer parallel aligned mounting faces with the planes of said faces extending transversely to the axis of said rod portion at approximately right angles, said torque rods being connected at one end thereof to said frame adjacent said trunnion on each side thereof, and their other ends extending to a point adjacent said axles with said inner and outer mounting faces on such other ends being spaced at different distances from said trunnion, a plurality of identical interchangeable torque rod mounting brackets on said axles comprising a base having a pair of spaced posts extending therefrom and said posts having a first and second pair of parallel aligned mounting faces thereon, and means for connecting said bracket posts to said torque rod side arms with either of said first and second mounting faces on said bracket abutting either of said inner and outer faces on said torque rod ends.

11. In a tandem axle suspension having a torque rod mounting system adaptable to a plurality of tandem axle spacings, a frame, a pair of springs extending from the ends of said trunnion, a pair of axles operatively connected to said springs one on each side of said trunnion, a plurality of identical interchangeable torque rods comprising a central elongated rod portion with a pair of side arms extending laterally therefrom at each end thereof, each of said side arms having a pair of spaced inner and outer parallel aligned mounting faces with the planes of said faces extending transversely to the axis of said rod portion at approximately right angles, said torque rods being connected at one end thereof to said frame adjacent said trunnion on each side thereof, and their other ends extending to a point adjacent said axles with said inner and outer mounting faces on such other ends being spaced a different distance from said trunnion, a plurality of identical interchangeable torque rod mounting brackets on said axles comprising a base having a pair of spaced posts extending therefrom and said posts having a first and second pair of parallel aligned mounting faces thereon, means for connecting said bracket posts to said torque rod side arms with either of said first and second mounting faces on said bracket abutting either of said inner and outer faces on said torque rod ends so that the position of the axis of either axle relative to the trunnion may be selected to achieve several different tandem axle spacings, the central transverse axis of each of said brackets coinciding with the longitudinal axis of said axles when secured thereon and said posts with said pair of faces thereon being offset from the central axis of said brackets to produce an eccentric effect, so that said brackets on either axle may be reversed to change the position of said latter mounting faces relative to the axis of the axle whereby the said eccentric effect of said brackets makes it possible to achieve several different tandem axle spacings with the same brackets.

12. In a vehicle, a tandem axle suspension having a torque rod mounting system adaptable to a plurality of different tandem axle spacings, a frame, a trunnion on said frame, a pair of springs extending from the ends of said trunnion, a pair of drive axles operatively connected to said springs one on each side of said trunnion, a plurality of identical interchangeable torque rods comprising a central elongated rod portion with a pair of side arms in a resilient mounting connection at each end thereof and extending laterally therefrom, each of said side arms having a pair of inner and outer spaced parallel aligned mounting faces with the planes of said faces parallel to a plane perpendicular to the axis of said rod portion, said torque rods being connected at one end thereof to said frame adjacent said trunnion and on each side thereof and their other ends extending to a point adjacent said axles with the inner and outer mounting faces on such other ends being spaced at different distances from said trunnion, a plurality of identical interchangeable torque rod mounting brackets on said axles each comprising a base having a pair of spaced posts extending therefrom and said posts having a first and second pair of parallel aligned mounting faces thereon, means for connecting said bracket posts to said torque rod side arms with either of said first and second mounting faces on said bracket abutting either of said inner and outer faces on said torque rod ends so that such torque rods are assembled in said tandem unit with the planes of said side arm faces at an acute angle with respect to a plane perpendicular to the axis of the rod portion so that each resilient mounting connection for such side arms is torsionally prestressed when the axle unit is not loaded, whereby when the side arm faces substantially resume original position when the vehicle is under load there is virtually no torsional prestress in said resilient side arm connections.

13. In a vehicle, a tandem axle suspension having a torque rod mounting system adaptable to a plurality of different tandem axle spacings, a frame, a trunnion on said frame, a pair of springs extending from the ends of said trunnion, a pair of axles operatively connected to said springs one on each side of said trunnion, a plurality of identical interchangeable torque rods comprising a central elongated rod portion with a pair of side arms in a resilient mounting connection at each end thereof and extending laterally therefrom, each of said side arms having a pair of inner and outer spaced parallel aligned mounting faces with the planes of said faces parallel to a plane perpendicular to the axis of said rod portion, said torque rods being connected at one end thereof to said frame adjacent said trunnion and on each side thereof and their other ends extending to a point adjacent said axles with the mounting faces on such other ends being spaced a different distance from said trunnion, means on at least one of said axle assemblies for connection with either the inner or outer of said torque rod mounting faces in abutting relation therewith, means for connecting said latter means to said torque rod side arms so that such torque rods are assembled in said tandem unit with the side arm faces at an acute angle with respect to a plane perpendicular to said rod axes so that each resilient mounting connection for such side arms is torsionally prestressed when the axle unit is not loaded whereby when the side arm faces substantially resume their original position when the vehicle is under load there is virtually no torsional prestress in said resilient side arm connections.

14. For a tandem axle suspension having a pair of axles and a torque rod mounting system comprising interchangeable mounting parts adaptable to a plurality of different tandem axle spacings, a torque rod mounting bracket suitable to connect any torque rod end to an axle comprising a base portion having means for mounting said bracket on an axle housing, a pair of laterally spaced posts extending from said base portion and each post having front and rear torque rod and mounting faces, the pair of front faces lying in a common transverse plane parallel to a common transverse plane containing the pair of rear faces and each said pair of said faces being adapted to be connected to the end of a torque rod in said suspension, said posts and said faces thereon being off-set from the bracket's central transverse axis to produce an eccentric effect whereby mounting of said bracket on an axle housing in either of two reversed positions makes it possible to achieve a large number of different tandem axle spacings in the suspension.

15. For a tandem axle suspension having a pair of axles and a torque rod mounting system comprising a plurality of interchangeable torque rods and axle mounting brackets, a torque rod suitable for use in all torque rod positions of said suspension comprising an elongated rod portion having a pair of side arms in a resilient mounting connection at each end thereof and extending laterally therefrom, each of said side arms having a pair of spaced inner and outer parallel aligned mounting faces with the planes thereof parallel to a plane perpendicular to said rod axis when the rod is apart from the suspension, whereby such torque rod is adapted to be assembled in said tandem axle suspension with said side arm faces at a small acute angle with respect to a plane perpendicular to the rod axis so that the resilient mounting connection for said side arms is torsionally prestressed when the tandem unit is not loaded and the side arm faces will substantially resume their original position when the vehicle is loaded and there is then virtually no torsional prestress in said resilient side arm connections.

16. For a tandem axle suspension having a pair of axles and a torque rod mounting system comprising a plurality of interchangeable torque rods, a torque rod suitable for use in any torque rod position of said suspension comprising an elongated rod portion having a pair of side arms in a resilient mounting connection at each end thereof and extending laterally therefrom, each of said side arms having a pair of spaced front and rear flat parallel aligned mounting faces with the front and rear faces lying respectively in spaced parallel planes thereof extending transversely to the axis of said rod.

17. In a tandem axle suspension having a torque rod mounting system adaptable to a plurality of different tandem axle spacings, a frame, a trunnion on said frame, a pair of springs extending from the ends of said trunnion, a pair of axles operatively connected to said springs one on each side of said trunnion, a set of identical interchangeable brackets on each axle, said brackets each having a plurality of torque rod mounting surfaces similarly spaced longitudinally of the suspension, a set of identical interchangeable torque rods connected to the frame adjacent the trunnion and each having a plurality of similarly longitudinally spaced mounting surfaces at their other ends, and means for connecting any one of said bracket mounting surfaces to any one of said torque rod mounting surfaces, whereby the position of the axis of either axle relative to the trunnion may be selected to achieve any of a large number of different tandem axle spacings.

18. In the vehicle defined in claim 5, said torque rod ends adjacent the axles each having two longitudinally spaced faces adapted to seat upon one or the other of said bracket post faces.

19. In a tandem axle suspension, two parallel axles, a plurality of parallel torque rods each extending from the frame intermediate the axles to dispose their outer ends adjacent the axles, means on each axle providing adjacent each torque rod end two torque rod mounting faces spaced apart longitudinally of the suspension, and means for attaching the outer torque rod ends to one or the other of the adjacent mounting faces on the axles to obtain different axle spacings in the suspension with the same torque rods.

References Cited in the file of this patent

UNITED STATES PATENTS

| | | |
|---|---|---|
| 127,240 | Howe | May 28, 1872 |
| 166,039 | Thomas | July 27, 1875 |
| 1,618,373 | Fairchild | Feb. 22, 1927 |
| 1,946,060 | Buckendale | Feb. 6, 1934 |
| 2,096,530 | Alden | Oct. 19, 1937 |
| 2,446,877 | Jones | Aug. 10, 1948 |
| 2,633,204 | Keller | Mar. 31, 1953 |
| 2,653,035 | Ward | Sept. 22, 1953 |